(12) United States Patent
Holmes

(10) Patent No.: US 8,070,649 B2
(45) Date of Patent: Dec. 6, 2011

(54) HYBRID POWERTRAIN AND DUAL CLUTCH TRANSMISSION

(75) Inventor: Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 493 days.

(21) Appl. No.: 12/351,544

(22) Filed: Jan. 9, 2009

(65) Prior Publication Data
US 2010/0179024 A1 Jul. 15, 2010

(51) Int. Cl.
*B60W 10/02* (2006.01)
(52) U.S. Cl. .................. 477/5; 74/661; 74/331
(58) Field of Classification Search ...... 180/65.1–65.25; 903/909, 915, 916, 917; 477/5; 74/331, 74/661
See application file for complete search history.

(56) References Cited

U.S. PATENT DOCUMENTS

| | | | | |
|---|---|---|---|---|
| 5,823,051 | A * | 10/1998 | Hall, III | 74/325 |
| 6,427,547 | B1 * | 8/2002 | Bowen | 74/329 |
| 6,427,549 | B1 * | 8/2002 | Bowen | 74/331 |
| 7,080,566 | B2 * | 7/2006 | Baldwin et al. | 74/331 |
| 7,140,267 | B2 * | 11/2006 | Haka | 74/331 |
| 7,226,379 | B2 * | 6/2007 | Ibamoto et al. | 475/221 |
| 7,331,897 | B2 * | 2/2008 | Ibamoto et al. | 475/221 |
| 7,448,290 | B2 * | 11/2008 | Gitt | 74/331 |
| 7,597,020 | B2 * | 10/2009 | Baldwin | 74/336 R |
| 7,963,191 | B2 * | 6/2011 | Holmes | 74/661 |
| 2002/0189397 | A1 * | 12/2002 | Sakamoto et al. | 74/661 |
| 2010/0023230 | A1 * | 1/2010 | Holmes | 701/51 |
| 2010/0269611 | A1 * | 10/2010 | Rieger | 74/331 |

FOREIGN PATENT DOCUMENTS

JP 60175845 A * 9/1985

* cited by examiner

*Primary Examiner* — J. Allen Shriver, II
*Assistant Examiner* — Emma K Frick

(57) ABSTRACT

An automatic dual clutch transmission includes an input clutch which selectively connects a prime mover to an electric motor. The electric motor, in turn, is connected to the inputs of a pair of coaxial friction clutches. Each of the coaxial outputs of the friction clutches drives an input gear with meshes with a pair of gears, one of which is associated with each of a respective pair of layshafts or countershafts. On each countershaft, between the pair of gears driven by the outputs of the two clutches, are a pair of synchronizer clutches which selectively synchronize and connect one of the two gears to the associated countershaft. A similar arrangement of a second pair of gears separated by synchronizer clutches connects the countershafts through a selected gear to a pair of output gears coupled to and driving a differential cage or spool.

19 Claims, 3 Drawing Sheets

| CLUTCH | 32 | 36 | 58A | 58B | 48A | 48B | 76B | 76A | 66B | 66A |
|---|---|---|---|---|---|---|---|---|---|---|
| GEAR | 40 | 42 | 52 | 54 | 44 | 46 | 74 | 72 | 64 | 62 |
| 1 | X |  | X |  |  |  | X |  |  |  |
| 2 |  | X |  | X |  |  | X |  |  |  |
| 3 | X |  | X |  |  |  |  | X |  |  |
| 4 |  | X |  | X |  |  |  | X |  |  |
| 5 | X |  |  |  | X |  |  |  | X |  |
| 6 |  | X |  |  |  | X |  |  | X |  |
| 7 | X |  |  |  | X |  |  |  |  | X |
| 8 |  | X |  |  |  | X |  |  |  | X |

FIG. 3A

| CLUTCH | 32 | 36 | 58A | 58B | 48A | 48B | 76B | 76A | 64B | 64A |
|---|---|---|---|---|---|---|---|---|---|---|
| GEAR | 40 | 42 | 52 | 54 | 44 | 46 | 74 | 72 | 64 | 62 |
| 1 | X |  | X |  |  |  | X |  |  |  |
| 2 |  | X |  | X |  |  | X |  |  |  |
| 3 | X |  |  |  | X |  |  |  | X |  |
| 4 |  | X |  |  |  | X |  |  | X |  |
| 5 | X |  | X |  |  |  |  | X |  |  |
| 6 |  | X |  | X |  |  |  | X |  |  |
| 7 | X |  |  |  | X |  |  |  |  | X |
| 8 |  | X |  |  |  | X |  |  |  | X |

FIG. 3B

HYBRID POWERTRAIN AND DUAL CLUTCH TRANSMISSION

FIELD

The present disclosure relates to a powertrain and transmission for a motor vehicle and more particularly to a hybrid powertrain and dual clutch transmission for a motor vehicle.

BACKGROUND

The statements in this section merely provide background information related to the present disclosure and may or may not constitute prior art.

Within the motor vehicle automatic transmission art, the dual clutch transmission (DCT) is a relative newcomer. A typical dual clutch transmission configuration includes a pair of mutually exclusively operating input clutches which drive a pair of layshafts or countershafts disposed on opposite sides of an output shaft. One of each of a plurality of pairs of constantly meshing gears which define the various forward gear ratios is freely rotatably disposed on one of the layshafts and the other of each pair of gears is coupled to the output shaft. A plurality of synchronizer clutches selectively couple one of the gears to the layshaft to achieve a forward gear ratio. After the synchronizer clutch is engaged, the input clutch associated with the active layshaft is engaged.

Dual clutch transmissions are known for their sporty, performance oriented shift characteristics. They typically exhibit good fuel economy due to good gear mesh efficiency and ratio selection flexibility in design. The synchronizer clutches have low spin losses which also contributes to overall operating efficiency.

However, dual clutch transmissions have several unique design considerations. For example, because of the torque throughput during launch and the heat that can be generated during slip, the input clutches must be of a relatively large size. The size requirement applies as well to the cooling system which must be able to dissipate relatively large quantities of heat. Finally, because such transmissions typically have many sets of axially aligned gears, their overall length may be problematic in some platform configurations.

The present invention is directed not only to providing a dual clutch automatic transmission have reduced axial length but also to such a transmission for incorporation into a hybrid powertrain.

SUMMARY

The present invention provides a dual clutch transmission and differential having reduced axial length for incorporation into a hybrid powertrain. The transmission is especially suited for transverse installation in front wheel drive vehicles. The transmission includes an input clutch which selectively connects a prime mover such as a gas, Diesel of flexible fuel engine to an electric motor. The input clutch may be disengaged when only electric motor operation is desired. The electric motor, in turn, is connected to the inputs of a pair of coaxial friction clutches. Each of the coaxial outputs of the friction clutches drives an input gear with meshes with a pair of gears one of which is associated with each of a respective pair of layshafts or countershafts. On each layshaft, between the pair of gears driven by the outputs of the two clutches are a pair of synchronizer clutches which selectively synchronize and connect one of the two gears to the associated layshaft. A similar arrangement of a second pair of gears flanked by synchronizer clutches connects the layshaft through a selected gear to a pair of output gears coupled to and driving a differential cage or spool. The outputs of the differential are parallel to and spaced from the axis the clutches, electric motor and input gears.

Thus it is an object of the present invention to provide a dual clutch automatic transmission.

It is a further object of the present invention to provide a dual clutch automatic transmission and electric drive motor.

It is a further object of the present invention to provide a dual clutch automatic transmission for use in a hybrid powertrain.

It is a further object of the present invention to provide a dual clutch automatic transmission having an integral differential.

It is a further object of the present invention to provide a dual clutch automatic transmission having reduced axial length.

It is a further object of the present invention to provide a dual clutch automatic transmission having an integral differential and reduced length.

Further objects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIGS. 3A and 3B are truth tables presenting the various states of the two coaxial clutches and four synchronizer clutches in the dual clutch transmission which achieve eight forward speeds or gear ratios;

DETAILED DESCRIPTION

The following description is merely exemplary in nature and is not intended to limit the present disclosure, application, or uses.

Figure 1:
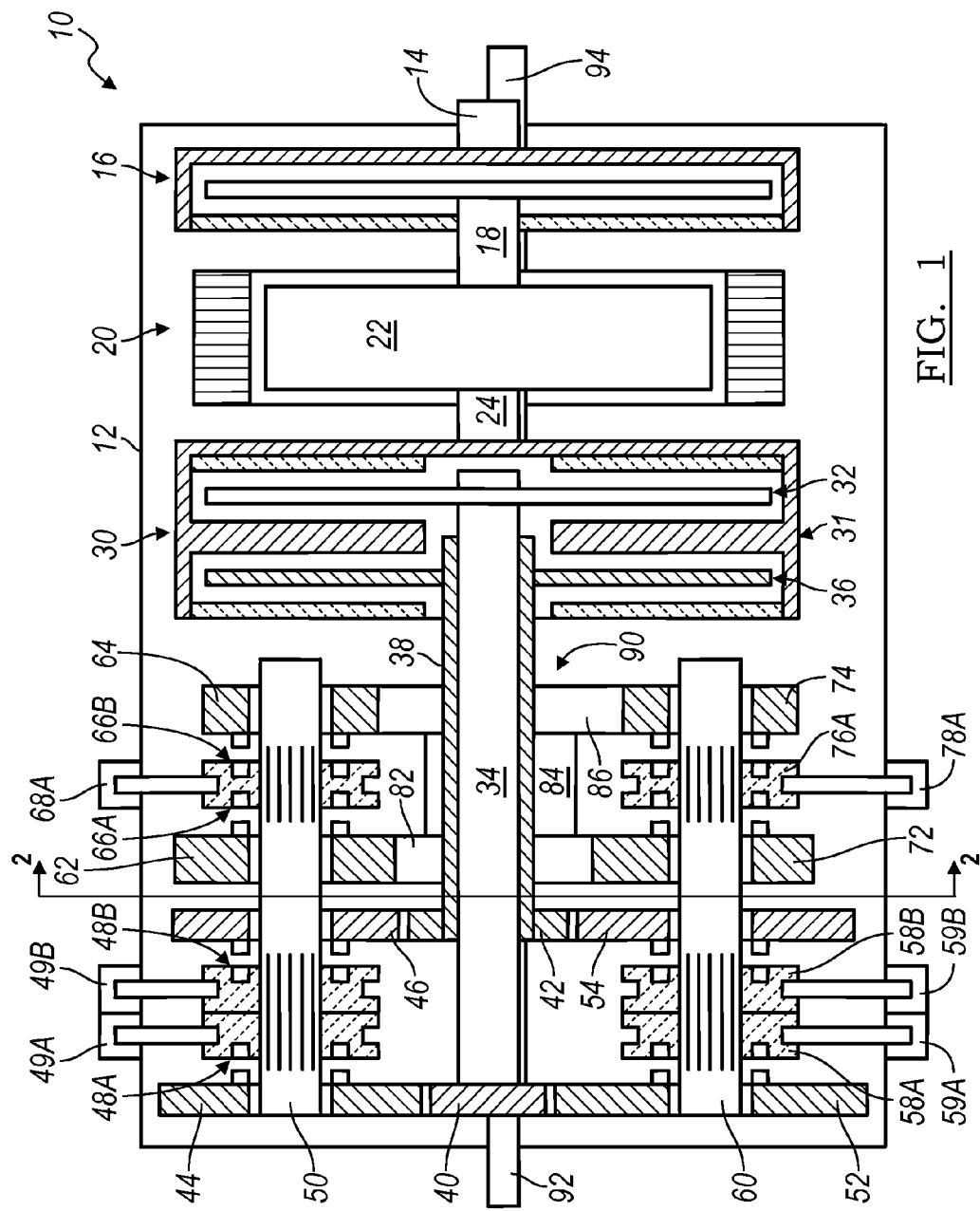
FIG. 1 is a schematic top plan view of a dual clutch automatic transmission according to the present invention.
Figure 2:
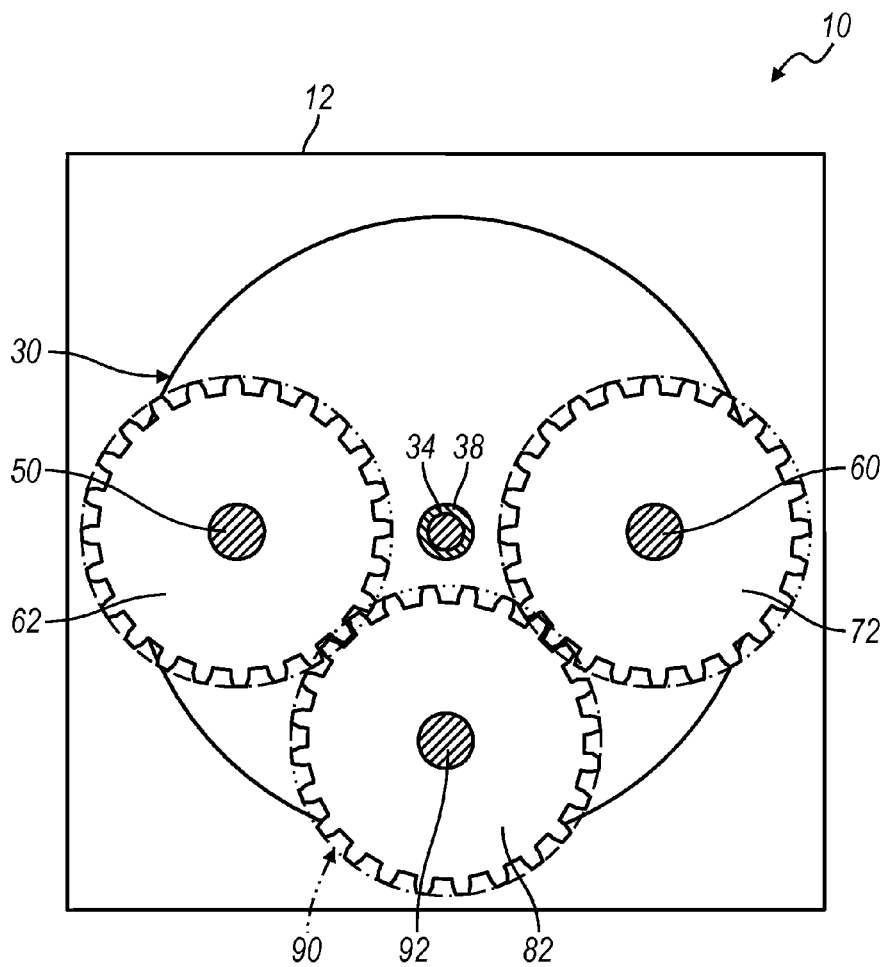
FIG. 2 is a schematic end elevational view of a dual clutch automatic transmission according to the present invention.

With reference now to FIGS. 1 and 2, a dual clutch automatic transmission according to the present invention is illustrated and generally designated by the reference number 10. The automatic transmission 10 includes a housing 12 which supports, receives and protects the various components of the automatic transmission 10 such as an input shaft or member 14 which receives drive torque from a prime mover such as a gasoline, Diesel or flexible fuel engine (not illustrated) and connects to and drives a main or input clutch 16. The main or input clutch 16 selectively engages to provide drive torque from the prime mover to a main clutch output shaft or member 18 which is coupled to an armature 22 of an electric motor 20 and disengages to disconnect the prime mover from the armature 22 of the electric motor 20. The electric motor 20 may be an induction motor or more preferably a permanent magnet or DC brushless motor. The electric motor 20 includes an output shaft or member 24 which provides drive torque to a dual clutch assembly 30. The dual clutch assembly 30 includes a common rotating housing or drive member 31 driven by the output shaft 24 and includes two coaxial single or multiple plate clutches and associated operators: a first drive clutch 32 which selectively provides drive torque to a first transmission drive shaft or member 34 and a second drive clutch 36 which selectively provides drive torque to a second transmission drive tube, quill or member 38 which is concentrically disposed about the first transmission drive shaft or member 34.

The first transmission drive shaft or member 34 terminates in a first drive gear 40 which is in constant mesh with a first input gear 44 freely rotatable disposed upon a first (upper) layshaft or countershaft 50 and a second input gear 52 freely rotatably disposed upon a second (lower) layshaft or countershaft 60. The first input gear 44 is active when third and seventh gears have been selected and the second input gear 52 is active when first and fifth gears have been selected. The second transmission drive tube, quill or member 38 terminates in a second drive gear 42 which is in constant mesh with a third input gear 46 which is freely rotatably disposed on the first layshaft or countershaft 50 and spaced from the first input gear 44. A fourth input gear 54 is freely rotatably disposed on the second layshaft or countershaft 60 and spaced from the second input gear 52. The third input gear 46 is active when fourth and eighth gears have been selected and the fourth input gear 54 is active when second and sixth gears have been selected.

Between the first input gear 44 and the third input gear 46 are a first pair of synchronizer clutches 48A and 48B. The first pair of synchronizer clutches 48A and 48B are conventional and operate to first synchronize and then positively connect the first input gear 44 and the third input gear 46, respectively, to the first layshaft or countershaft 50. Associated with the first pair of synchronizer clutches 48A and 48B are a pair of operator and shift fork assemblies 49A and 49B which axially and bi-directionally translate the clutches 48A and 48B along the layshaft or countershaft 50 and which may be either electric, hydraulic or pneumatic. Likewise, between the second input gear 52 and the fourth input gear 54 are a pair of synchronizer clutches 58A and 58B. The second pair of synchronizer clutches 58A and 58B are conventional and operate to first synchronize and then positively connect the second input gear 52 and the fourth input gear 54 respectively, to the second layshaft or countershaft 60. A pair of electric, hydraulic or pneumatic operator and shift fork assemblies 59A and 59B operate the second pair of synchronizer clutches 58A and 58B.

A first output gear 62 is freely rotatably disposed on the first layshaft or countershaft 50 adjacent the third input gear 46 and is in constant mesh with a third driven gear 82 secured to and driving a cage or housing 84 of a differential assembly 90. A second output gear 72 is freely rotatably disposed on the second layshaft or countershaft 60 adjacent the fourth input gear 54 and is also in constant mesh with the third driven gear 82. The first output gear 62 is active when seventh and eighth gears have been selected and the second output gear 72 is active when fifth and sixth gears have been selected. A third output gear 64 is freely rotatably disposed on the first layshaft or countershaft 50, spaced from the first output gear 62 and in constant mesh with a fourth driven gear 86 secured to and driving the cage or housing 84 of the differential assembly 90. A fourth output gear 74 is freely rotatably disposed on the second layshaft or countershaft 60, spaced from the third output gear 64 and in constant mesh with the fourth driven gear 86. The third output gear 64 is active when third and fourth gears have been selected and the fourth output gear 74 is active when first and second gears have been selected.

Between the first output gear 62 and the third output gear 64 are a third pair of synchronizer clutches 66A and 66B. The third pair of synchronizer clutches 66A and 66B is conventional and operates to synchronize and connect the first output gear 62 and the third output gear 64, respectively, to the first layshaft or countershaft 50. One electric, hydraulic or pneumatic operator and shift fork assembly 68 operates the third pair of synchronizer clutches 66A and 66B. Likewise, between the second output gear 72 and the fourth input gear 74 are a fourth pair of synchronizer clutches 76A and 76B. The fourth pair of synchronizer clutches 76A and 76B is conventional and operate to synchronize and connect the second output gear 72 and the fourth output gear 74, respectively, to the second layshaft or countershaft 60. One electric, hydraulic or pneumatic operator and shift fork assembly 78 operates the fourth pair of synchronizer clutches 76A and 76B.

The differential assembly 90 and specifically the cage or housing 84 is driven through either the first driven gear 82 or the second driven gear 86, as noted. The differential assembly 90 includes four bevel gears (not illustrated) within the housing 84 disposed in pairs on two perpendicular axes and an opposed (coaxial) pair of these bevel gears are coupled to and drive a first output shaft 92 and a second, coaxial output shaft 94. The output shafts 92 and 94 may be coupled to drive wheels through universal joints (all not illustrated).

It should be understood that reverse gear may be provided by a number of alternate means. For example, the main or input clutch 16 may be disengaged and the electric motor 20 may be energized to rotate in reverse and drive through a low speed (high ratio) gear such as first or second gear. Alternatively, an additional (idler) gear and synchronizer clutch (not illustrated) may be incorporated into the automatic transmission 10 to operate in conjunction with for example, the gears 52 or 74 on the second countershaft 60.

FIGS. 3A and 3B are truth tables presenting two alternate clutching schemes for the automatic transmission 10. An "X" in a row for a particular speed or gear ratio indicates that the actuator and countershaft clutch or the actuator and synchronizer clutch associated with the gear indicated by the column heading are activated and engaged. It should be noted that due to the shift and clutching sequence of FIG. 3B, it is possible to utilize a single synchronizer clutch operator 68A and 78A on the first countershaft 50 and the second countershaft 60, respectively, rather than operate the pairs of synchronizer clutches 66A and 66B and 76A and 76B separately with the shift and clutching sequence of FIG. 3A due to pre-staging or preselection requirements.

The foregoing description of the invention is merely exemplary in nature and variations that do not depart from the gist of the invention are intended to be within the scope of the invention. Such variations are not to be regarded as a departure from the spirit and scope of the invention and the following claims.

What is claimed is:

1. A dual clutch automatic transmission comprising, in combination,
    a input clutch having an input adapted to be driven by an engine and an output,
    an electric motor coupled to said output of said input clutch,
    a pair of clutches having inputs coupled to said electric motor and having a first clutch output and a second clutch output,
    a first countershaft and a second countershaft spaced from and parallel to said first countershaft
    a first gear coupled to said first clutch output and in constant mesh with a first input gear disposed on said first countershaft and a second input gear disposed on said second countershaft, a second gear coupled to said second clutch output and in constant mesh with a third input gear disposed on said first countershaft and a fourth input gear disposed on said second countershaft, a first synchronizer clutch assembly disposed on said first countershaft between said first and said third input gears for selectively connecting said gears to said first countershaft, a second synchronizer clutch assembly disposed on said second countershaft between said second and said fourth input gears for selectively connecting said gears to said second countershaft, a first output gear disposed on said first countershaft and in constant mesh with a first differential input gear, a second output gear disposed on said second countershaft and in constant mesh with said first differential input gear, a third output gear disposed on said first countershaft and in constant mesh with a second differential input gear, a fourth output gear disposed on said second countershaft and in constant mesh with a said second differential input gear, a third synchronizer clutch assembly disposed on said first countershaft between said first and said third output gears for selectively connecting said gears to said first countershaft, a fourth synchronizer clutch assembly disposed on said second countershaft between said second and said fourth output gears for selectively connecting said gears to said second countershaft, and a differential assembly driven by said first and said second differential gears and having a pair of coaxial outputs.

2. The dual clutch transmission of claim 1 wherein said synchronizer clutch assemblies between said input gears include two synchronizer clutches.

3. The dual clutch transmission of claim 1 wherein said synchronizer clutch assemblies between said output gears include a single synchronizer clutch.

4. The dual clutch transmission of claim 1 wherein each of said input and output gears is utilized with two forward gear ratios.

5. The dual clutch transmission of claim 1 wherein said electric motor is bi-directional and provides reverse.

6. The dual clutch transmission of claim 1 wherein said first input gear is associated with third and seventh gears, said second input gear is associated with first and fifth gears, said third input gear is associated with fourth and eighth gears and said fourth input gear is associated with second and sixth gears.

7. The dual clutch transmission of claim 1 wherein said first output gear is associated with seventh and eighth gears, said second output gear is associated with fifth and sixth gears, said third output gear is associated with third and fourth gears and said fourth output gear is associated with first and second gears.

8. A dual clutch transmission comprising, in combination, a pair of clutches having a common input and first and second outputs, a first countershaft and a second countershaft spaced from and parallel to said first countershaft a first gear coupled to said first output and in constant mesh with a first input gear disposed on said first countershaft and a second input gear disposed on said second countershaft, a second gear coupled to said second output and in constant mesh with a third input gear disposed on said first countershaft and a fourth input gear disposed on said second countershaft, a first synchronizer clutch assembly disposed on said first countershaft between said first and said third input gears for selectively connecting said gears to said first countershaft, a second synchronizer clutch assembly disposed on said second countershaft between said second and said fourth input gears for selectively connecting said gears to said second countershaft, a first output gear disposed on said first countershaft and in constant mesh with a first differential input gear, a second output gear disposed on said second countershaft and in constant mesh with said first differential input gear, a third output gear disposed on said first countershaft and in constant mesh with a second differential input gear, a fourth output gear disposed on said second countershaft and in constant mesh with a said second differential input gear, a third synchronizer clutch assembly disposed on said first countershaft between said first and said third output gears for selectively connecting said gears to said first countershaft, a fourth synchronizer clutch assembly disposed on said second countershaft between said second and said fourth output gears for selectively connecting said gears to said second countershaft, and a differential assembly driven by said first and said second differential gears and having a pair of coaxial outputs.

9. The dual clutch transmission of claim 8 wherein said synchronizer clutch assemblies disposed between said input gears include two synchronizer clutches.

10. The dual clutch transmission of claim 8 wherein said synchronizer clutch assemblies disposed between said output gears include a single synchronizer clutch.

11. The dual clutch transmission of claim 8 wherein each of said input and output gears is utilized with two forward gear ratios.

12. The dual clutch transmission of claim 8 wherein said electric motor is bi-directional and provides reverse.

13. The dual clutch transmission of claim 8 wherein said first input gear is associated with third and seventh gears, said second input gear is associated with first and fifth gears, said third input gear is associated with fourth and eighth gears and said fourth input gear is associated with second and sixth gears.

14. The dual clutch transmission of claim 8 wherein said first output gear is associated with seventh and eighth gears, said second output gear is associated with fifth and sixth gears, said third output gear is associated with third and fourth gears and said fourth output gear is associated with first and second gears.

15. A dual clutch automatic transmission comprising, in combination, a pair of clutches having a commonly driven input and first and second independent outputs, a first countershaft and a second countershaft, a first gear coupled to said first output and in constant mesh with a first input gear disposed on said first countershaft and a second input gear disposed on said second countershaft, a second gear coupled to said second output and in constant mesh with a third input gear disposed on said first countershaft and a fourth input gear disposed on said second countershaft, first synchronizer clutches disposed on said first countershaft between said first and said third input gears for selectively connecting said gears to said first countershaft, second synchronizer clutches disposed on said second countershaft between said second and said fourth input gears for selectively connecting said gears to said second countershaft, a first output gear disposed on said first countershaft and a second output gear disposed on said second countershaft in constant mesh with a first differential input gear, a third output gear disposed on said first countershaft and a fourth output gear disposed on said second countershaft in constant mesh with a second differential input gear, a third synchronizer clutch disposed on said first countershaft between said first and said third output gears for selectively connecting said gears to said first countershaft, a fourth synchronizer clutch disposed on said second countershaft between said second and said fourth output gears for selectively connecting said gears to said second countershaft, and a differential assembly driven by said first and said second differential input gears and having a pair of coaxial outputs.

16. The dual clutch transmission of claim 15 wherein each of said input and output gears is utilized with two forward gear ratios.

17. The dual clutch transmission of claim 15 wherein said electric motor is bi-directional and provides reverse.

18. The dual clutch transmission of claim 15 wherein said first input gear is associated with third and seventh gears, said second input gear is associated with first and fifth gears, said third input gear is associated with fourth and eighth gears and said fourth input gears is associated with second and sixth gears.

19. The dual clutch transmission of claim 15 wherein said first output gear is associated with seventh and eighth gears, said second output gear is associated with fifth and sixth gears, said third output gear is associated with third and fourth gears and said fourth output gear is associated with first and second gears.

* * * * *